Patented Aug. 20, 1946

2,405,966

UNITED STATES PATENT OFFICE 2,405,966

SYNTHESIS OF NITRILES

Donald John Loder, Wilmington, Del., assignor to E. I. du Pont de Nemours & Company, Wilmington, Del., a corporation of Delaware No Drawing. Application February 1, 1944, Serial No. 520,687

5 Claims. (Cl. 260—464)

This invention relates to the synthesis of nitriles, and particularly to a new method for preparing nitrilotriacetonitrile, $N(CH_2CN)_3$.

Nitrilotriacetonitrile has been prepared hitherto by reaction between hexamethylene tetramine and hydrogen cyanide. This process is somewhat wasteful because of the poor yield obtained. Another method which has been proposed is to heat a mixture of formaldehyde, concentrated hydrochloric acid, sodium cyanide and ammonium sulfate for periods of about 40 hours. This method also is objectionable because of the long reaction time which it consumes.

An object of the present invention is to provide a process whereby nitrilotriacetonitrile may be made without appreciable loss of reactants to by-products. Another object is to provide an industrially feasible method for the manufacture of nitrilotriacetonitrile. Another object is to provide a process for manufacture of nitrilotriacetonitrile from cheap starting materials in a comparatively short reaction time.

These and other objects are accomplished in accordance with this invention by reacting aminoacetonitrile with formaldehyde and hydrogen cyanide, preferably in an acidic medium. The reaction may be written as follows:

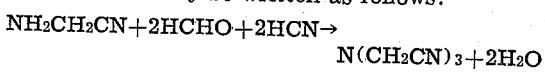

$NH_2CH_2CN + 2HCHO + 2HCN \rightarrow$
$N(CH_2CN)_3 + 2H_2O$

A particular feature of this invention is that surprisingly high reaction rates, and high yields of nitrilotriacetonitrile are obtained when a very large excess of hydrogen cyanide is present in the reaction mixture.

The aminoacetonitrile used as one of the reactants in accordance with this invention may be prepared by treating formaldehyde cyanhydrin with anhydrous ammonia, or by any other suitable process. While pure aminoacetonitrile may be used, it is frequently convenient to employ aminoacetonitrile in the form of an aqueous solution, such as a solution of 35% to 70% concentration. The formaldehyde used in carrying out the invention may be anhydrous or may be associated with water in any concentration, such as in the commercial 37% solution. Acid-reacting materials in general are suitable catalysts, the preferred catalysts being aqueous mineral acids particularly hydrochloric acid.

For best results the molal ratio of aminoacetonitrile to formaldehyde in the reaction mixture should be close to the stoichiometric ratio of 1:2, although a slight excess of formaldehyde is often useful in obtaining nitrilotriacetonitrile of high quality. In general the molal ratio of aminoacetonitrile to formaldehyde should be initially between 1:1.9 and 1:2.4. When this ratio is below 1:1.9 the product is low-melting, due to the presence therein of iminodiacetonitrile. Large excess of formaldehyde should be avoided because of the difficulty of removing it from the desired reaction products. Large excess of the hydrogen cyanide reactant is, however, beneficial. Thus, favorable yields are obtained when the molal ratio of hydrogen cyanide to aminoacetonitrile initially is in excess of 2:1, a suitable range being from 10:1 to 20:1 or even higher.

The amount of acid-reacting catalyst used in carrying out this invention is not particularly critical. A convenient amount is in the range of from about 0.01 to 2.0 equivalents of acid per mole of aminoacetonitrile initially present. Larger amounts may be used, but are generally unnecessary. Likewise the quantity of water in the reaction mixture may vary widely, without appreciable effect on reaction rate or yield. Generally, it is helpful to have sufficient water present to dissolve the formaldehyde, but larger amounts may be used without any important detrimental effect.

In one manner of carrying out this invention, the reaction mixture, comprising aminoacetonitrile, formaldehyde, hydrogen cyanide and mineral acid catalyst, is maintained at a temperature slightly above room temperature for about two or three hours. It is quite possible to isolate the product in a time shorter than two hours, but product quality usually suffers when this is attempted. This is because the proportion of iminodiacetonitrile in the product is higher, hence the melting point is lower, when reaction time is short.

The reaction may take place at a temperature of 19° C. to 60° C., although towards the end of the reaction period the temperature may be raised to a temperature in the range 60° C. to 105° C. The preferred temperature is, however, in the range of from 19° C. to 38° C. Since the reaction is highly exothermic, means should be provided for the dissipation of at least part of the reaction heat. This heat may be absorbed as heat of vaporization of hydrogen cyanide, hence it is generally desirable to equip the reactor with a suitable reflux condenser.

After the reaction is complete the excess hydrogen cyanide may be recovered by any conventional means, such as distillation. Nitrilotriacetonitrile (melting point of crude, usually about 121° to 122° C.) can be crystallized from the resultant mixture.

In crystallizing nitrilotriacetonitrile the usual expedients of concentrating, cooling, seeding and the like may be employed when necessary. The yield of nitrilotriacetonitrile thus obtained is generally at least 74% and in some instances as high as 89%, based on the amount of aminoacetonitrile initially present.

The following examples will illustrate this invention in greater detail.

*Example 1.*—A mixture made up from 69.9 grams of a 39% aqueous solution of aminoacetonitrile, 82.6 grams of a 37% aqueous solution of formaldehyde, 202.9 grams of hydrogen cyanide and 2.9 grams of concentrated hydrochloric acid was maintained at a temperature of 19° C. to 38° C. for 2.25 hours in a reaction vessel which was equipped with a still-head which served as a means for refluxing the hydrogen cyanide. Thereafter the reaction vessel contents were heated to 81° C., and the evolved hydrogen cyanide was condensed by the still-head and was recovered as condensate. The reaction product was subsequently cooled, and, when a temperature of 75° C. was reached, crystals began to appear. Cooling was continued until the temperature was 28° C. The resulting material was freed of solvent by centrifuging and filtering. Thus white crystalline nitrilotriacetonitrile (weight, 65.3 grams) having a melting point of 119° C. to 124° C. was obtained.

*Example 2.*—A mixture made up from 9.5 grams of a 60% aqueous solution of aminoacetonitrile, 6.2 grams of paraformaldehyde, 44.4 grams of hydrogen cyanide and 0.6 gram of concentrated hydrochloric acid was maintained at a temperature of 30° C. to 31° C. for 1.25 hours in a reaction vessel equipped with a reflux condenser. Thereafter the excess HCN was expelled by heating the reaction mixture to a temperature of 105° C. The resulting product was chilled to 10° C. causing the formation of crystals, which, when isolated and dried, weighed 10.5 grams (melting point, 112° C. to 118° C.) Upon recrystallization of this product from water, purified nitrilotriacetonitrile (weight 9.5 grams) was obtained.

It is evident that numerous changes may be made in the manner of conducting the reaction between amino acetonitrile, formaldehyde and hydrogen cyanide without departing from the scope of this invention. For example the reaction may be carried out in a closed pressure-resisting vessel, and at pressures higher than atmospheric. The reaction heat may be dissipated through cooling coils, water-jackets, or other convenient means. The acidic catalysts may be neutralized, or removed in the form of insoluble salts, prior to isolating the product. The formaldehyde used as a reactant may be added not only as formalin or paraformaldehyde, but in any other convenient form. If desired, the formaldehyde and hydrogen cyanide may be introduced into the reaction vessel as formaldehyde cyanhydrin or as a mixture of formaldehyde cyanhydrin and hydrogen cyanide. The mineral acid catalysts include not only hydrochloric acid but sulfuric and phosphoric acids and other similar inorganic acids. Stable organic acids may also be used as catalysts, or as reaction media. The crude reaction product, as noted above, sometimes contains iminodiacetonitrile as impurity. Mother liquors obtained in the crystallization of nitrilotriacetonitrile can profitably be recycled with a new batch of reactants.

The process of this invention is well adapted to operation in a continuous manner, in which case tubular converters may be used under conditions of either viscous or turbulent flow. Alternatively, the reaction may be conducted in a stirred autoclave, or a falling-film type of reactor. It will be understood that many apparently widely differing embodiments of this invention may be made without departing from the spirit and scope thereof.

I claim:

1. In a process for the preparation of nitrilotriacetonitrile the steps which comprise reacting aminoacetonitrile with formaldehyde and hydrogen cyanide in the presence of an aqueous mineral acid catalyst, the initial molal ratio of formaldehyde to aminoacetonitrile being between 1.9:1 and 2.4:1, and the initial molal ratio of hydrogen cyanide to aminoacetonitrile being between 10:1 and 20:1, continuing the reaction for a period of about 2 to 3 hours at a temperature within the range of about 19° C. to 60° C., raising the temperature at the end of the reaction period to about 60° C. to 105° C., and recovering nitrilotriacetonitrile from the resultant mixture.

2. In a process for the preparation of nitrilotriacetonitrile the steps which comprise heating aminoacetonitrile with from 1.9 to 2.4 moles of formaldehyde per mole of aminoacetonitrile and with from 10 to 20 moles of hydrogen cyanide per mole of aminoacetonitrile, in the presence of an aqueous mineral acid catalyst at a temperature in the range of from 19° C. to 60° C., thereafter removing excess hydrogen cyanide from the reaction mixture by distillation, and subsequently crystallizing nitrilotriacetonitrile from the resultant product.

3. In a process for the preparation of nitrilotriacetonitrile the steps which comprise heating aminoacetonitrile with from 1.9 to 2.4 moles of formaldehyde per mole of aminoacetonitrile and with at least 10 moles of hydrogen cyanide per mole of aminoacetonitrile in the presence of aqueous mineral acid catalyst at a temperature in the range of from 19° C. to 60° C., continuing the resultant reaction for a period not shorter than about 2 hours, distilling hydrogen cyanide from the resultant reaction product, and thereafter recovering nitrilotriacetonitrile from the resulting residue.

4. A process for the preparation of nitrilotriacetonitrile which comprises heating 1.0 molal equivalent of aminoacetonitrile with about 2.0 molal equivalents of aqueous formaldehyde and from 10 to 20 molal equivalents of hydrogen cyanide at 19° C. to 60° C. in the presence of 0.01 to 0.20 equivalents of mineral acid catalyst, thereafter heating the reaction mixture to a temperature in the range 60° C. to 105° C. to expel unreacted hydrogen cyanide, and subsequently crystallizing nitrilotriacetonitrile from the resultant mixture.

5. A process for the preparation of nitrilotriacetonitrile which comprises heating 1.0 molal equivalent of aminoacetonitrile with 1.9 to 2.4 molal equivalents of aqueous formaldehyde and from 10 to 20 molal equivalents of hydrogen cyanide at 19° C. to 38° C. in the presence of 0.01 to 0.20 equivalents of hydrochloric acid for about 2 or 3 hours, thereafter recovering the unreacted hydrogen cyanide by distillation while heating the reaction mixture to a temperature in the range 60° C. to 105° C., and subsequently crystallizing nitrilotriacetonitrile from the resulting reaction product.

DONALD JOHN LODER.